United States Patent Office 3,298,832
Patented Jan. 17, 1967

3,298,832
COPPER GLUCONATE CONTAINING RECEIVING ELEMENT AND ITS DIFFUSION TRANSFER PHOTOGRAPHY USE
William H. Ryan, Carlisle, Mass., assignor to Polaroid Corporation, Cambridge, Mass., a corporation of Delaware
Filed Sept. 26, 1962, Ser. No. 226,326
4 Claims. (Cl. 96—3)

This invention relates to photography and, more particularly, to novel photographic diffusion-transfer processes and products for utilization therein.

It is one object of the present invention to provide novel diffusion-transfer processes and products for utilization therein whereby improved silver transfer images may be produced.

Another object of the present invention is to provide novel additive color diffusion-transfer processes and products for utilization therein whereby improved additive color reproduction, especially improved color saturation, may be attained.

A further object of the present invention is to provide novel diffusion-transfer processes and products providing increased transfer image density.

A still further object of the present invention is to provide novel diffusion-transfer processes and products providing increased transfer image contrast.

A still further object of the present invention is to provide novel diffusion-transfer processes and products providing increased process speed.

A still further object of the present invention is to provide novel photographic products and processes wherein a positive diffusion-transfer image is disposed in a single stratum, self-substaining dimensionally stable image-receiving element.

A still further object of the present invention is to provide novel photographic products and processes wherein a positive diffusion-transfer image is disposed in an image-receiving stratum exhibiting increased resistance to abrasion.

Other objects of the present invention will in part be obvious and will in part appear hereinafter.

The invention accordingly comprises the process involving the several steps and the relation and order of one or more of such steps with respect to each af the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawing wherein.

Figure 3:
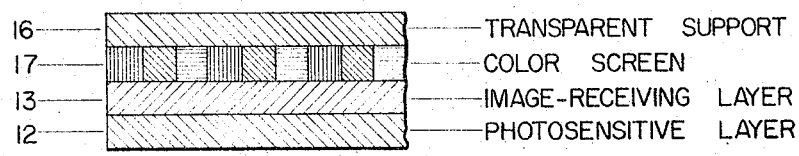
Figure 4:
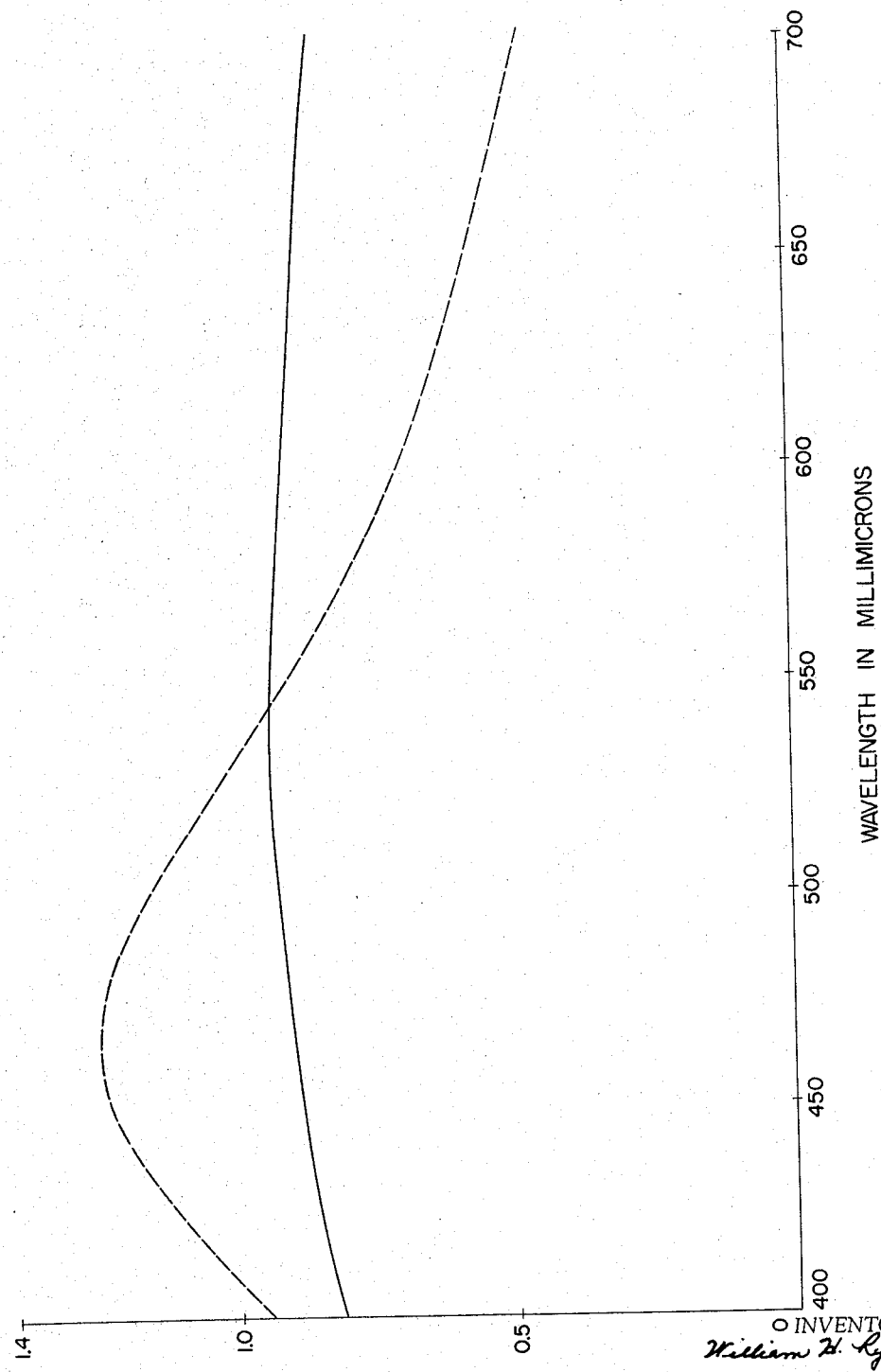

FIG. 3 is a diagrammatic enlarged cross-sectional view of one embodiment of the novel image-receiving elements of the present invention, for use in obtaining additive multicolor images, comprising a support, an additive color screen element, an embodiment of the present invention as the image-receiving stratum, and a photosensitive silver halide emulsion; and FIG. 4 is a graphic illustration of the spectral absorption characteristics of a preferred image-receiving element, prepared and processed in accordance with the instant disclosure, superposed upon the spectral absorption characteristics of a control image-receiving element, wherein the spectral absorption characteristics of the former are set forth as a solid line curve and those of the latter as a broken line curve.

The present invention comprehends improved processes and products of the type whereby a positive print is obtained in a single step by suitably treating an exposed photosensitive element in superposed relationship to an appropriate image-receiving element with a processing composition.

In diffusion-transfer processes an exposed photosensitive silver halide emulsion is developed and almost concurrently therewith a soluble silver complex is obtained by reaction of a silver halide solvent with the unexposed and undeveloped silver halide of said emulsion. Preferably, the photosensitive silver halide emulsion is developed with a processing composition in a viscous condition which is spread between the photosensitive element comprising the silver halide emulsion, and a print-receiving element comprising, preferably, a suitable silver precipitating layer. The processing composition effects development of the latent image in the emulsion and substantially contemporaneous therewith forms a soluble silver complex, for example, a thiosulfate or thiocyanate, with undeveloped silver halide. This soluble silver complex is, at least in part, transported in the direction of the print-receiving element and the silver thereof is largerly precipitated in the silver precipitating layer of said element to form a positive image therein.

Additive color reproduction may be produced by exposing a photosensitive silver halide emulsion through an additive color screen having filter media or screen elements each of an individual additive color, such as red or blue or green, and by viewing the reversed or positive silver image formed by transfer to a transparent, print-receiving element through the same or a similar screen which is suitably registered with the reversed positive image carried by the print-receiving layer.

It has now been discovered that diffusion-transfer processes such as those previously mentioned may be improved by the use of a print-receiving medium containing gluconic acid in the form of the free acid or a metal salt thereof.

As examples of metal salts of gluconic acid suitable for use in the invention, mention may be made of the sodium, ferrous, manganous, calcium, stannous, and copper salts.

The concentration of gluconic acid disposed in the image-receiving layer may be varied over a wide range according to the thickness and character of the image-receiving stratum employed.

The preferred compound comprises copper gluconate which when disposed in the image-receiving element quite unexpectedly provides transfer images possessing increased density and contrast, in addition to providing increased process speed and improved positive image spectral absorption characteristics.

The image-receiving layer, in addition to the gluconic acid, comprises one or more strata of a permeable material. As examples of such materials, mention may be made of: regenerated cellulose; polyvinyl alcohol; partially hydrolyzed polyvinyl acetate; sodium alginate; cellulose ethers such as methylcellulose, sodium carboxymethyl cellulose or hydroxyethyl cellulose; papers; proteins such as glue or gelatin; carbohydrates such as deacetylated chitin, gums or starches; and mixtures of such materials, as for example, polyvinyl alcohol and gelatin, where they are compatible.

Preferably the gluconic acid is dispersed in a polymeric matrix comprising, in whole or in part, deacetylated chitin. The preferred combinations comprise deacetylated chitin in gelatin or polyvinyl alcohol as image-receiving matrices.

The presence of deacetylated chitin in the image-receiving layer provides, subsequent to contact of said chitin with alkali, as for example, an alkaline photographic processing composition, a substantially water-insoluble, abrasion-resistant matrix which may be substantially flexible, semi-rigid, or rigid depending upon the concentration of the deacetylated chitin contained in said image-receiving element. In addition, the deacetylated chitin affords substantial protection to the positive image. An image-receiving layer comprising, at least in part, deacetylated chitin may be washed, for example, to effect removal of a photosensitive emulsion and/or film-forming processing composition adhering thereto, or residual undesired reagents remaining therein, without deleterious effects. Where desirable, the concentration of deacetylated chitin disposed in the print-receiving element may be of sufficient magnitude to provide an integral single layer element exhibiting sufficient internal support as to substantially alleviate the necessity of providing one or more separate supporting layers.

In the following description, the invention is described in terms of preferred embodiments which employ copper gluconate; however, it will be recognized that gluconic acid and/or other metal salts thereof may be substituted for the preferred compound.

Figure 1:
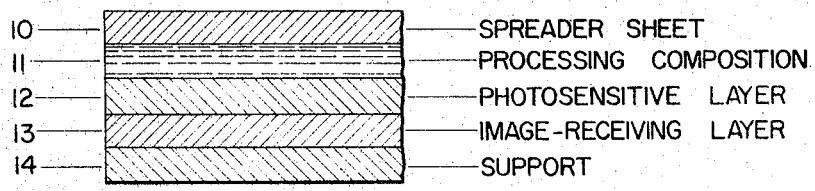
FIGURE 1 is a diagrammatic enlarged cross-sectional view illustrating the association of elements during one stage of the performance of a diffusion-transfer process for the production of positive silver prints and showing, as one of the elements, an embodiment of the novel print-receiving elements of the present invention, the thicknesses of the various materials being exaggerated.

Referring now to FIGURE 1, one embodiment of the novel image-receiving layers of the present invention in the performance of a transfer process for the production of positive silver prints comprises a spreader sheet 10, a layer of relatively viscous processing agent 11, a photosensitive silver halide emulsion layer 12, an image-receiving layer 13 containing deacetylated chitin, copper gluconate, and preferably containing silver precipitating nuclei, such as the silver precipitating nuclei disclosed in United States Patent No. 2,698,237, issued December 28, 1954, to Edwin H. Land, and a suitable support layer 14. Support layer 14 may comprise an opaque material where a reflection print is desired or may comprise a transparent material where a transparency is desired.

Liquid layer 11 may be obtained by spreading a photographic processing composition, for example, in a manner disclosed in U.S. Patent No. 2,698,244, issued December 28, 1954, to Edwin H. Land. As disclosed in the aforementioned U.S. patent, the liquid processing composition may be disposed in a rupturable container so positioned in regard to the appropriate surface of the silver halide emulsion that, upon compression by spreader sheet 10, a substantially uniform layer 11 of processing composition is distributed over the surface of said photosensitive emulsion 12, positioned distally from the copper gluconate and deacetylated chitin-containing image-receiving layer 13. The processing composition may be one of the film-forming processing compositions disclosed in U.S. Patent No. 2,543,181, issued February 27, 1951, to Edwin H. Land. It may comprise, for example, a developing agent such as hydroquinone, an alkali such as sodium hydroxide, a silver halide complexing agent such as sodium thiosulfate, and a high molecular weight film-forming thickening agent such as sodium carboxymethyl cellulose. All these materials are preferably in aqueous solution. These photographic agents are preferably contained in solution in the processing liquid prior to the spreading thereof as layer 11, but they may be in part or wholly added to the processing composition as it is spread between spreader sheet 10 and photosensitive silver halide emulsion 12, said agents being so located on or adjacent to the surface of one or both of said layers as to be dissolved by or otherwise interacted with the liquid agent when the latter wets said surface.

In carrying out the aforementioned transfer process, the photosensitive silver halide emulsion 12 is exposed to a predetermined subject matter to form therein a latent image of said subject matter. A substantially uniform distribution of processing composition 11 is distributed on the external surface of said emulsion, as for example, according to the previously described procedure. Processing composition reagents premeate into the photosensitive emulsion, developing the latent image contained therein according to the point-to-point degree of exposure of said emulsion. Substantially contemporaneous with the development of the latent image, an imagewise distribution of soluble silver complex is formed from unexposed silver halide within said emulsion. At least part of said silver complex, solubilized, is transferred, by imbibition, to the copper gluconate and deacetylated chitin-containing print-receiving stratum 13. The transferred silver complex there reacts to provide a positive, reversed image of the latent image. Subsequent to formation of the positive image in the copper gluconate and deacetylated chitin-containing image-receiving layer 13, dissociation of said layer from emulsion layer 12 may be effected.

Where desired, the copper gluconate and deacetylated chitin-containing image-receiving layer 13 may be dissociated from emulsion layer 12 by washing the emulsion from the surface thereof with water. It must be noted that the abrasion-resistant properties provided image-receiving element 13 by the inclusion therein of deacetylated chitin alleviates the necessity of subsequently overcoating the external surface of image-receiving layer 13 with a transparent abrasion-resistant water-insoluble plastic to prevent subsequent laceration and resultant degradation of the positive image.

The fabrication of the novel print-receiving elements of the present invention will be illustrated in greater detail in conjunction with the following specific example which sets out a representative image-receiving element and the utilization thereof in a diffusion transfer process of the last-mentioned type. This example is intended to be illustrative only.

EXAMPLE 1

A diffusion transfer film unit was prepared by coating a solution which was formulated by admixing 5.0 cc. of 8% deacetylated chitin dissolved in 3% acetic acid; 0.36 cc. of a 2.9% lead acetate and 2.1% calcium acetate mixture in water; 0.3 cc. of 2.6% sodium sulfide solution in water; 5.0 cc. of 8% copper gluconate solution in water; and 10.0 cc. of water, on transparent film base.

The above coating was dried and a 0.1% cellulose acetate hydrogen phthalate solution in acetone was applied to the external surface for strip coat purposes. The strip coat was then dried and a silver iodobromide emulsion was applied to its external surface.

The photosensitive film unit was then exposed and processed by spreading an aqueous liquid processing composition comprising 265.5 cc. of water; 11.67 grams of sodium carboxymethyl cellulose; 10.62 grams of sodium hydroxide; 10.80 grams of sodium sulfate; 17.10 grams of sodium sulfide; 9.51 grams of hydroquinone; and 1.47 grams of Amidol, on the external surface of the photosensitive emulsion. After an imbibition period of approximately two minutes the image-receiving element was stripped from the emulsion and contained a positive transfer image of the photographed subject.

A second film unit was prepared, exposed and processed according to the last-mentioned procedure, with the exception that the image-receiving element did not contain copper gluconate.

Spectrophotometric analysis of the resultant positive prints reveal the spectral absorption characteristics of a silver transfer image formed with an image-receiving element, which did not contain the copper gluconate, to be as detailed by the broken line curve set forth in FIG. 4 of the drawing and the spectral absorption characteristics of a silver transfer image formed with an image-receiving element, prepared and processed in accordance with the instant disclosure, to process the advantageous broad range response, e.g., more neutral tone, detailed by the solid line curve set forth in FIG. 4 of the drawing.

By reason, at least in part, of the aforementioned advantageous broad range or neutral tone response characteristics, multicolor additive transfer products and processes are available which provide multicolor additive transfer images possessing improved color saturation.

The last-mentioned example was repeated employing gluconic acid, sodium gluconate, ferrous gluconate, manganous gluconate, calcium gluconate, and stannous gluconate in place of the aforementioned preferred copper gluconate.

In the aforementioned example, spreading of the liquid processing composition on the external surface of the photosensitive emulsion is preferably effected by rupture of a suitably positioned frangible container and distribution of its processing composition contents by means of a converted cellulose acetate spreader sheet, i.e., a cellulose acetate sheet the surface of which has been converted to cellulose. When employed in Example 1, the converted cellulose acetate spreader sheet exhibited an adhesive capacity for the processing composition in excess of the adhesive capacity exhibited by the photosensitive emulsion. A means is thus provided for effecting dissociation of the processing composition from contact with the photosensitive emulsion, preferably subsequent to image formation, by dissociating the spreader sheet from its proximate relationship to the external emulsion surface.

It will be apparent that the facility with which the photosensitive emulsion layer is dissociated from contact with the print-receiving element may be increased by providing a conventional stripping layer interposed between said emulsion and the print-receiving element, as illustrated in the example.

Figure 2:
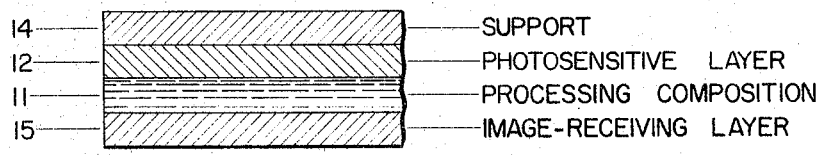
FIG. 2 is a view similar to that of FIG. 1 illustrating the association of elements during one stage of the performance of another diffusion-transfer process for the production of positive silver prints which illustrates another embodiment of the novel print-receiving elements of the present invention.

A further embodiment of the present invention is illustrated in FIG. 2, which comprises a photosensitive silver halide emulsion 12, a layer 11 of the previously noted relatively viscous film-forming processing composition, and an image-receivng layer 15 containing copper gluconate and a sufficient concentration of deacetylated chitin to provide a self-sustaining, dimensionally stable, rigid, semi-rigid or flexible film and preferably containing silver precipitating nuclei.

As previously stated, layer 11 of processing composition may be distributed in a substantially uniform manner between photosensitive emulsion layer 12 and image-receiving layer 15, for example, in accordance with the procedures disclosed in the aforementioned U.S. Patent No. 2,543,181. For example, one or more rupturable containers may be attached to either photosensitive emulsion layer 12 and/or image-receivng layer 15 such that upon superposition of the respective layers 12 and 15 said container or containers are so positioned as to be capable, upon rupture, of releasing their contents in a substantially uniform layer between and in contact with the opposed surface of each of said layers. Rupture of the container or containers and spreading of the contents thereof may be accomplished, for example, by compression between a pair of opposed, suitably gapped, rollers.

In carrying out the aforementioned transfer process, the photosensitive silver halide emulsion 12 is exposed to a predetermined subject matter to form therein a latent image of said subject matter. The exposed emulsion is superposed on the copper gluconate-containing image-receiving element 15 and the photographic processing composition 11 spread between the opposed surfaces of said photosensitive emulsion 12 and said image-receiving element 15. Reagents permeate into the photosensitive emulsion 12, developing the latent image contained therein and forming a soluble silver complex of unexposed silver halide. Soluble silver complex is transported from photosensitive emulsion layer 12, at least in part, by imbibition, to the copper gluconate and deacetylated chitin-containing print-receiving stratum 15 and the silver of the complex is precipitated thereat to provide the desired positive image. The lamination formed by the spreading of processing composition in layer 11 between photo-sensitive emulsion 12 and print-receiving element 15 is kept intact for approximately ½ to 1½ minutes, preferably 1 minute, and at the termination of this time interval the copper gluconate and deacetylated chitin-containing print-receiving layer 15 is dissociated from emulsion 12, as for example, by stripping.

As illustrated in FIG. 3, one embodiment of the present invention for use in additive multicolar diffusion processes is a composite film unit comprising a transparent support 16, an additive color screen element 17, an image-receiving layer 13 containing copper gluconate and deacetylated chitin and preferably containing silver precipitating nuclei, and a photosensitive silver halide emulsion 12.

In carrying out an additive multicolor diffusion-transfer process utilizing the aforementioned composite film unit, exposure of the photosensitive silver halide emulsion to a predetermined subject matter is effected through color screen element 17. A liquid processing composition is applied to photosensitive emulsion 12, as for example, according to the procedure previously described in explanation of FIGURE 1. The liquid processing composition permeates into photosensitive emulsion 12, developing the latent image contained therein, forming an imagewise distribution of soluble silver complex in the unexposed areas thereof, and transferring, at least part of said imagewise distribution, by imbibition, toward image-receiving layer 13 wherein the silver of said complex is precipitated to provide a reversed positive silver image of said latent image. Dissociation of emulsion layer 12 from image-receiving layer 13 may be accomplished, for example, according to the procedure previously described in explanation of FIGURE 1. As previously stated, in additive multicolor processes the viewing of the positive image takes place through a stationarily registered color screen element, either that screen element through which exposure was accomplished or a duplicate thereof. Although in the aforementioned process exposure is accomplished through the stationary color screen element predisposed in the image-receiving element, thus avoiding the problems incident upon attempts to register a mobile screen element with the deposited silver image, it must be noted that the inventive concept of the present specification is equally applicable to the numerous additive multicolor diffusion-transfer processes utilizing color screen elements in combination with silver transfer porcesses, such as, for example, the additive multicolor transfer processes disclosed in U.S. Patent No. 2,614,926, issued October 21, 1952, to Edwin H. Land.

U.S. Patent No. 2,707,150, issued April 26, 1955, to Edwin H. Land, discloses additive multicolor processes utilizing a color screen element in a photosensitive emulsion wherein, subsequent to the selective exposure of the photosensitive emulsion through said color screen and substantially simultaneous with the development of the latent image contained therein, the color screen element filter media, preferably soluble dyes, transfer, at least in part, by imbibition to an image-receiving element to form therein a substantially duplicate screen pattern of the original color screen. In the practice of this procedure utilizing an image-receiving layer comprising chitin, the deacetylated chitin exhibits the properties of a mordant for numerous of the potentially available soluble dyes utilized as filter media.

The following example illustrates the fabrication of additional print-receiving elements of the present invention and the utilization thereof in additive multicolor diffusion-transfer processes, which example, however, is not limited to the details therein set forth and is intended to be illustrative only.

EXAMPLE 2

An additive multicolor print-receiving element was prepared by coating a film base, which comprises a transparent plastic support having a preformed additive color screen thereon, with the copper gluconate containing solution of Example 1. After this coating dried, a silver iodobromide emulsion was applied thereon. This photosensitive emulsion was exposed through the transparent support and additive color screen. The exposed emulsion was then processed by spreading a liquid processing composition such as that set forth in Example 1 on the external surface of the said emulsion. After an imbibition period of approximately one minute, the emulsion was separated from the copper gluconate deacetylated chitin-containing print receiving layer which contained a positive transfer image of the photographed subject.

Viewing of the multicolor additive positive transfer image took place through the transparent base and preformed additive color screen through which exposure was accomplished.

Especially suitable, for use in the instant print-receiving elements, as silver precipitating agents or nuclei are the metallic sulfides and selenides, these terms being understood to include the selenosulfides, the polysulfides, and the polyselenides. Preferred in this group are the so-called "heavy metal sulfides" previously noted. For best results it is preferred to employ sulfides whose solubility products in an aqueous medium at approximately 20° C. vary between $10^{-23}$ and $10^{-30}$ and especially the salts of zinc, cadmium and lead. Also suitable as precipitating agents are heavy metals such as silver, gold, platinum, palladium, and mercury, and in this category the noble metals are preferred and are preferably provided in the matrix as collodial particles. The salts of these heavy metals, preferably the simple inorganic and readily reducible salts such as silver nitrate, gold chloride and gold nitrate, are also useful as silver precipitating agents. In some instances, the metals are introduced into the matrices as salts and then reduced in situ prior to the use of the reception material in the silver transfer process to give a layer whose silver precipitating agent is a colloidal metal. Where the salts are relatively light- or heat-sensitive, this reduction may be accomplished simply by exposing the silver precipitating layer to diffused light or to heat. Still other satisfactory silver precipitating agents are certain of the thio compounds, for example, dithiooxamide and its lead and zinc complexes, potassium dithiooxalate and the lead and nickel complexes thereof, and thioacetamide. The silver precipitating agents as noted above are provided in highly dispersed condition, preferably as colloidal particles.

Where the silver precipitating agent is one or more of the heavy metal sulfides or selenides, it is preferable to prevent the diffusion and wandering of the sulfide or selenide ions, as the case may be, by also including, in the silver precipitating layers or in separate layers closely adjacent thereto, at least one metallic salt which is substantially more soluble in the processing agent than the heavy sulfide or selenide used as the silver precipitating agent and which is irreducible in the processing agent. This more soluble salt has, at its cation, a metal whose ion forms sulfides or selenides which are difficultly soluble in the processing agent and which give up their sulfide or selenide ions to silver by displacement. Accordingly, in the presence of sulfide or selenide ions the metal ions of the more soluble salts have the effect of immediately precipitating the sulfide or selenide ions from solution. These more soluble or ion-capturing salts may be soluble salts of any of the following metals: cadmium, cerium(ous), cobalt(ous), iron, lead, nickel, manganese, thorium, and tin. Satisfactory soluble and stable salts of the above metals may be found, for example, among the following groups of salts: the acetates, the nitrates, the borates, the chlorides, the sulfates, the hydroxides, the formates, the citrates, and the dithionates. The acetates and nitrates of zinc, cadmium, nickel, and lead are preferred. In general, it is also preferable to use the white or lightly colored salts although for certain special purposes the more darkly colored salts may be employed.

The previously mentioned ion-capturing salts may also serve a function of improving the stability of the positive print provided they possess, in addition to the aforementioned characteristics, the requisites specified in U.S. Patent No. 2,584,030 issued to Edwin H. Land. For example, if the ion-capturing salt is a salt of a metal which slowly forms insoluble or slightly soluble metallic hydroxides with the hydroxyl ions in the alkaline processing liquid, it will suitably control the alkalinity of the print-receiving element to substantially, if not totally, prevent the formation of undesirable developer stains.

While a rupturable container provides a convenient means for spreading a liquid processing composition between layers of a film unit whereby to permit the processing to be effected within a suitable camera apparatus, the processes of this invention may be otherwise effected. For example, a photosensitive element, after exposure in suitable apparatus and while preventing further exposure thereafter to actinic light, may be removed from such apparatus and permeated with the liquid processing composition as by coating the composition on said photosensitive element or otherwise wetting said element with the composition, following which the permeated, exposed, photosensitive element, still without additional exposure to actinic light, is brought into contact with the image-receiving element for mage formation in the manner heretofore described. Details of such rupturable containers as illustrated in FIG. 2 may be found in United States Patent No. 2,634,886, issued April 14, 1953, to Edwin H. Land.

The fabrication of and employment of deacetylated chitin containing image-receiving elements are disclosed in the copending U.S. application of Ryan et al., Serial No. 808,123, filed April 22, 1959 now U.S. Patent No. 3,087,815.

Since certain changes may be made in the above products and processes without departing from the scope of the invention herein involved, it is intended that all matter contained in the above description or shown in the accompanying drawing shall be interpreted as illustrative and not in a limiting sense.

What is claimed is:

1. As a product, a photographic image-receiving element, for use in diffusion transfer processes, which comprises a common support having affixed thereto a layer containing copper gluconate and silver precipitating nuclei dispersed in a permeable polymeric matrix.

2. As a product, a photographic image-receiving element, for use in additive multicolor diffusion transfer processes, which comprises a common, transparent support having affixed thereto, in order from one surface thereof, an additive multicolor screen and a layer containing copper gluconate, silver precipitating nuclei, and deacetylated chitin.

3. In a diffusion transfer process, the steps which comprise developing an exposed photosensitive silver halide emulsion with a processing composition comprising a silver halide developing agent and a silver halide solvent, forming thereby an imagewise distribution of soluble silver complex as a function of the point-to-point degree of exposure thereof, and transferring at least part of said imagewise distribution of soluble silver complex, by imbibition, from said emulsion, to a superposed image-receiving layer containing copper gluconate and slver precipitating nuclei dispersed in a permeable matrix, to thereby provide a visible transfer image.

4. In an additive multicolor diffusion transfer process, the steps which comprise exposing a photosensitive silver halide emulsion through an additive color screen, said screen being a component of an image-receiving element which comprises a layer containing copper gluconate, silver precipitating nuclei and deacetylated chitin, developing said emulsion by contact with an aqueous alkaline solution containing a silver halide developing agent and a silver halide solvent, forming thereby an imagewise distribution of soluble silver complex as a function of the point-to-point degree of emulsion exposure, and transferring, by imbibition, at least part of said imagewise distribution of soluble silver complex, from said emulsion, to said layer containing said copper gluconate to thereby provide a visible transfer image to said image-receiving element.

References Cited by the Examiner

UNITED STATES PATENTS

| | | | |
|---|---|---|---|
| 2,257,440 | 9/1941 | Wood | 96—61 |
| 2,584,017 | 1/1952 | Dvorkovitz | 252—156 |
| 2,584,030 | 1/1952 | Land | 96—29 |
| 2,635,048 | 4/1953 | Land | 96—29 |
| 2,650,875 | 9/1953 | Dvorkovitz | 41—42 |
| 2,662,822 | 12/1953 | Land | 96—29 |
| 2,698,237 | 12/1954 | Land | 96—29 |
| 3,073,723 | 1/1963 | Deal et al. | 96—33 |
| 3,087,815 | 4/1963 | Ryan et al. | 96—3 |

NORMAN G. TORCHIN, *Primary Examiner.*

G. H. BJORGE, A. E. TANENHOLTZ, D. LEVY,
*Assistant Examiners.*